United States Patent [19]
Hall et al.

[11] Patent Number: 5,974,541
[45] Date of Patent: Oct. 26, 1999

[54] GPIB SYSTEM AND METHOD WHICH PROVIDES ASYNCHRONOUS EVENT NOTIFICATION

[75] Inventors: Mike Hall, Round Rock; Clay Bean, Austin, both of Tex.

[73] Assignee: National Instruments Corporation, Austin, Tex.

[21] Appl. No.: 08/898,050

[22] Filed: Jul. 22, 1997

[51] Int. Cl.[6] .......................... G06F 19/00; G05B 23/02
[52] U.S. Cl. ...................... 712/228; 709/108; 710/100
[58] Field of Search .......................... 712/228; 709/108; 710/100, 260, 262; 702/123; 364/191

[56] References Cited

U.S. PATENT DOCUMENTS

| | | | |
|---|---|---|---|
| 5,717,614 | 2/1998 | Shah et al. | 702/119 |
| 5,724,272 | 3/1998 | Mitchell et al. | 702/123 |
| 5,771,388 | 6/1998 | Mondrik et al. | 395/735 |
| 5,845,140 | 12/1998 | Stanley et al. | 395/750.06 |
| 5,847,955 | 12/1998 | Mitchell et al. | 364/191 |

*Primary Examiner*—Gopal C. Ray
*Attorney, Agent, or Firm*—Conley, Rose & Tayon; Jeffrey C. Hood

[57] ABSTRACT

A GPIB system which includes asynchronous event notification. The GPIB application first provides a notify request to GPIB driver level software, preferably an ibnotify call or a GPIB Notify OLE control. The notify request includes a unit descriptor which uniquely identifies the GPIB device, event information regarding a plurality of GPIB events to monitor, a reference to a callback function in the GPIB application, and user defined reference data for the callback function. In response to the notify request, the GPIB driver level software begins monitoring events specified by the event information. When an event occurs which is being monitored, the GPIB driver level software recognizes the event and invokes the callback function. The invocation of the callback function is performed asynchronously to the GPIB application. The callback function may include one or more calls to one or more functions in the GPIB driver software. The callback function also uses the user defined reference data to aid in handling the event.

20 Claims, 4 Drawing Sheets

GPIB SYSTEM AND METHOD WHICH PROVIDES ASYNCHRONOUS EVENT NOTIFICATION

FIELD OF THE INVENTION

The present invention relates to GPIB driver level software, and more particularly to a method for providing asynchronous event notification in a GPIB system.

DESCRIPTION OF THE RELATED ART

The IEEE 488 bus, also referred to as the General Purpose Instrumentation Bus (GPIB), is used for connecting instruments and controllers to a common bus to perform various test and measurement functions. A typical GPIB system comprises one or more GPIB instruments, up to 14 instruments, and a controller, typically a GPIB interface board installed in a general purpose computer, connected by standard GPIB cables. A GPIB software application executes on the computer to control the instruments. The GPIB application interfaces through GPIB driver level software to the GPIB controller.

In response to the GPIB application, the controller provides program commands to the instruments, and the instruments return formatted data and response messages to the controller. GPIB instruments are message-based devices which are programmed with high-level ASCII character strings. A respective GPIB device includes a local processor that parses the command strings and sets the appropriate register bits to perform the indicated functions.

The original ANSI IEEE 488 standard, now referred to as IEEE 488.1, was introduced in 1975 and greatly simplified the interconnection of programmable instruments by clearly defining mechanical, electrical and hardware protocol specifications. This enabled users to connect instruments from different manufacturers to a standard cable, thus allowing the instruments to communicate with each other. The original IEEE 488.1 standard dramatically improved the productivity of test engineers. However, this original standard included a number of limitations. More specifically, the IEEE 488.1 standard did not specify data formats, status reporting guidelines, a message exchange protocol, configuration commands, or a minimum set of device commands. As a result, different manufacturers implemented each item differently, resulting in integration problems for the test system developer.

In 1987, a new IEEE 488 standard for programmable instruments and devices was approved which strengthened the original IEEE 488.1 standard by precisely defining how controllers and instruments communicated with each other. The IEEE 488.2 standard kept the IEEE 488.1 standard completely intact while also defining standard data codes and formats, a status reporting model, a message exchange protocol, a set of common commands for all instruments, and controller requirements, therefore making systems more compatible and simplifying program development. In general, the IEEE 488.2 standard focuses on software protocol issues while the IEEE 488.1 standard is primarily hardware oriented.

Thus the ANSI/IEEE Standard 488.1-1987, also known as GPIB (General Purpose Interface Bus), describes a standard interface for communication between instruments and controllers from various vendors. The IEEE 488.1 standard contains information about electrical, mechanical, and functional specifications. The GPIB is a digital, 8-bit parallel communications interface with data transfer rates of 1 Mbytes/s and above, using a 3-wire handshake. The bus supports one System Controller, usually a computer, and up to 14 additional instruments. The ANSI/IEEE Standard 488.2-1992 extends IEEE 488.1 by defining a bus communication protocol, a common set of data codes and formats, and a generic set of common device commands.

As noted above, a GPIB system includes GPIB driver level software which interfaces between a GPIB application and the GPIB hardware. The de facto standard for GPIB driver level software are the NI-488 and NI-488.2 software architectures, collectively referred to as the NI-488 software architecture, which is available in the NI-488 and NI-488.2 driver software products available from National Instruments. The NI-488 software architecture includes an Application Programming Interface (API) which allows the GPIB application to call or invoke functions in the GPIB driver level software to communicate with the GPIB hardware. In other words, the GPIB driver level software handles the details of communication, ie., the transfer of commands and data, over the GPIB connection between the computer and the GPIB instruments. GPIB driver level software has traditionally been required to poll a device to determine when an event occurs. This typically requires a large amount of unnecessary processor time, thus consuming value CPU resources. Therefore, a system and method is desired for providing asynchronous event notification in a GPIB system.

SUMMARY OF THE INVENTION

The present invention comprises a system and method which provides asynchronous event notification in a GPIB system. The method operates to asynchronously notify a user when one or more GPIB events occur in the GPIB system. The GPIB system comprises a GPIB application which interfaces through GPIB driver software to a GPIB device, wherein the GPIB application and the GPIB driver software execute on a computer system.

The method comprises first receiving a notify request from the GPIB application. The notify request is preferably an ibnotify call or a GPIB Notify OLE control. The notify request includes a unit descriptor which uniquely identifies the GPIB device, event information regarding a plurality of GPIB events to monitor, a reference to a callback function in the GPIB application, and user defined reference data for the callback function.

In response to the notify request, the GPIB driver level software begins monitoring events specified by the event information. The events comprise state changes of the GPIB device identified by the unit descriptor. When an event occurs which is being monitored, an interrupt is generated and provided to the GPIB driver level software. In response to the received interrupt, the GPIB driver level software determines that an event specified by the event information has occurred. The GPIB driver level software then invokes the callback function in response to determining that the event has occurred. According to the present invention, the invocation of the callback function is performed asynchronously to the GPIB application.

The callback function may include one or more calls to one or more functions in the GPIB driver software. In this case, when the callback function is executed to handle the event, the callback function invokes the one or more functions in the GPIB driver software. The callback function also uses the user defined reference data to aid in handling the event.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation By Reference

The IEEE 488.1 specification and the IEEE 488.2 specification published by the IEEE are both hereby incorporated by reference in their entirety.

The NI-488 and NI-488.2 reference manuals, available from National Instruments Corporation, are hereby incorporated by reference in their entirety.

Figure 1:
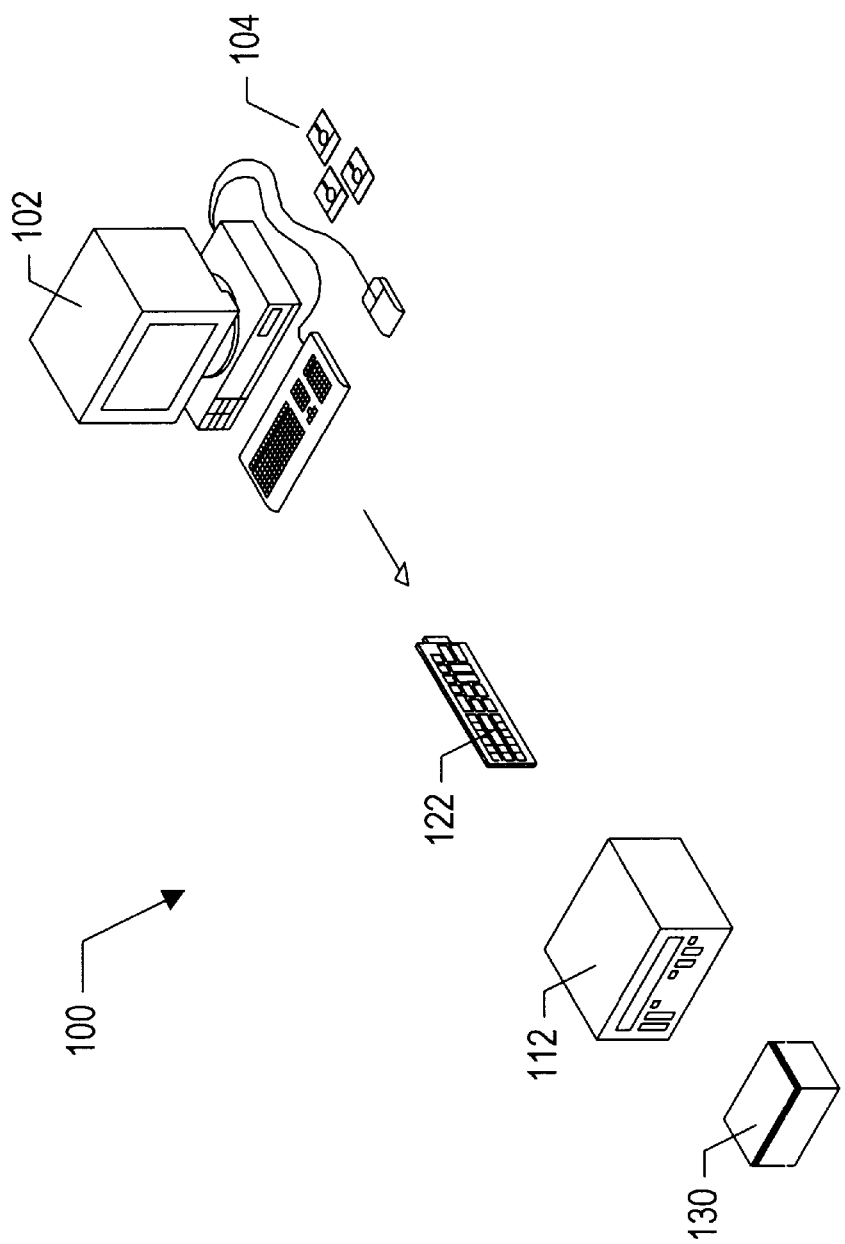
FIG. 1 illustrates a GPIB instrumentation system.

FIG. 1—GPIB Instrumentation System

Referring now to FIG. 1, a GPIB instrumentation control system 100 is shown. The system 100 comprises a computer 102 which connects to one or more GPIB instruments. The computer 102 comprises a CPU, a display screen, memory, and one or more input devices such as a mouse or keyboard as shown. The computer 102 connects to one or more GPIB instruments 112 to analyze, measure or control a unit under test (UUT) or process 130.

The GPIB instrument 112 is coupled to the computer 102 via a GPIB interface card 122 provided by the computer 102. The GPIB card 122 is typically plugged in to an I/O slot in the computer 102, such as a PCI bus slot, a PC Card slot, or an ISA, EISA or MicroChannel bus slot provided by the computer 102. However, the GPIB interface card 122 is shown external to computer 102 for illustrative purposes. It is noted that various other types of instruments may be comprised in the instrumentation system 100, such as a data acquisition board, a VXI instrument, or a serial instrument.

The GPIB instruments are coupled to the unit under test (UUT) or process 130, or are coupled to receive field signals, typically generated by transducers. The system 100 may be used in a data acquisition and control application, in a test and measurement application, a process control application, or a man-machine interface application, among others.

The computer 102 preferably includes a memory media, such as a magnetic media, CD-ROM, or floppy disks 104. The memory media preferably stores a multi-threaded GPIB application and also stores GPIB driver level software according to the present invention. The present invention comprises GPIB driver level software according to the present invention stored on a memory and/or hard drive of the computer 102 and executed by a CPU of the computer 102. The GPIB driver level software operates to enable asynchronous event notification in a GPIB system. The CPU executing code and data from the memory thus comprises a means for allowing asynchronous event notification in a GPIB system according to the steps described below.

Figure 2:
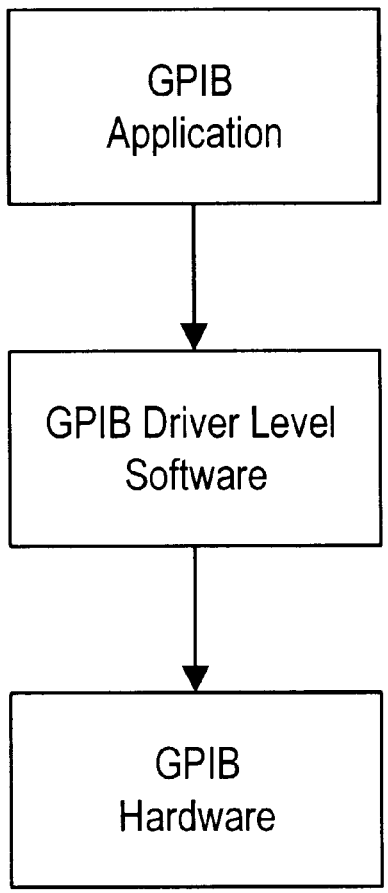
FIG. 2 illustrates the software architecture of the GPIB instrumentation system.

FIG. 2—GPIB Software Architecture

Referring now to FIG. 2, the software architecture for a GPIB instrumentation system is shown. As shown, the software architecture comprises a GPIB application program which interfaces through GPIB driver level software to one or more GPIB instruments.

The top level of the software architecture typically comprises a GPIB application program used for high level control of the GPIB instrument(s). The GPIB application program may operate in conjunction with one or more instrument drivers to interface through the GPIB driver level software to the GPIB instruments. The GPIB application program may be created with various development platforms, such as the LabVIEW graphical programming language or the LabWindows\CVI interactive C development environment. These software development environments include fully integrated GPIB libraries for instrument control. The GPIB application makes calls to various functions in the GPIB driver level software to communicate with the GPIB hardware.

The GPIB driver level software interfaces the commands or function calls in the GPIB application to the actual GPIB interface. In other words, in response to function calls made by the application, the GPIB driver level software communicates with the GPIB controller to control the GPIB instruments. The GPIB driver level software thus handles the details of communication, i.e., the transfer of commands and data, over the GPIB connection between the computer and the GPIB instruments. As discussed in the background section, the de facto standard for GPIB driver level software is the NI-488 software architecture available from National Instruments. The NI-488 software architecture includes an Application Programming Interface (API) which allows the GPIB application to call or invoke functions in the GPIB driver level software to communicate with the GPIB hardware.

As discussed above, the GPIB hardware comprises a GPIB interface card, typically a plug-in card to a personal computer, which couples through the GPIB to the one or more GPIB instruments.

Synchronous Event Notification

In many GPIB applications, GPIB events are used to monitor system status or respond to instruments that are requesting service. Traditional methods for responding to GPIB events involve synchronous waits on the events of interest or polling loops that periodically check the GPIB status variable, ibsta, for the events of interest.

Asynchronous Event Notification

According to the present invention, GPIB applications can asynchronously receive event notification using one of two mechanisms, these being the ibnotify function, or the GpibNotify OLE control. Asynchronous callback functions offer a new approach for automatically executing blocks of code when one or more GPIB events are detected. Using the ibnotify, or the GpibNotify ActiveX (OLE), function and the asynchronous event notification technique, applications can eliminate wasted processing time associated with using synchronous waits or the polling technique.

Asynchronous event notification is useful where the user desires the GPIB application to be notified asynchronously about the existence of one or more GPIB events. For example, asynchronous event notification can be used where the GPIB application only needs to interact with the GPIB device when it is requesting service. After setting up for event notification, the application does not need to check the status of the GPIB device. When the GPIB device requests service, the GPIB driver automatically notifies the application that the event has occurred by invoking a callback function. The callback function is registered as part of the original GPIB event notification request.

In the preferred embodiment, both board-level and device-level GPIB events are supported. For device-level events, both ibnotify and GpibNotify take a device handle and a mask that can contain the following GPIB event bits: RQS, CMPL, END, or TIMO. For board-level events, both ibnotify and GpibNotify take a board handle and a mask that can contain any GPIB event bits except RQS or ERR. It is noted that the mask bits are identical to the ibwait mask bits. In the example of waiting for the GPIB device to request service, the user may desire to pass a mask with RQS (for device-level) or SRQI (for board-level). The user-defined callback function that is registered is invoked by the GPIB driver when one or more of the mask bits are TRUE.

For more information on usage, please refer to either the ibnotify Usage or the GpibNotify Usage sections below. For more specific information about ibnotify or the GpibNotify OLE control, please refer to the ibnotify/GpibNotify function definition below.

Benefits of Asynchronous Callback Functions

In basic GPIB communication, a command is written to the device and then the response is read back. Both of these operations are generally performed synchronously with the read following the write. However, many times, devices may require a period of time to take measurements and prepare a response to a given query. When this is the case, processor time is wasted if the application simply calls a synchronous GPIB write and then waits until the response is available to do a read operation.

For example, consider the following sequence of function calls:

```
ibwrt(ud, command, count)    Write a Command
ibwait(ud, RQS)              Wait For the Device To Request Service
ibrd(ud, data, count)        Read The Data
```

A command is written to the device specified by the unit descriptor ud and then the application waits until the device requests service to read back the desired data. The time spent waiting on the RQS GPIB event is lost.

Another approach for waiting on a GPIB event to occur is to write a command to the device and then periodically poll the device until the desired event has occurred. Between polls to the device, other operations can be carried out by the application. For example,

```
ibwrt(ud, command, count);       Write a Command
while (!(ibsta & RQS)) {          End Loop If Device Requested Service
   Other Processing               Do Other Program Tasks
   ibwait(ud,0);                  Check For Device Requesting Service
}
ibrd(ud,count);                   Read The Data
```

However, this still requires periodic polling calls to be made from the application. These polls take processor time away from other tasks. Depending on the polling frequency, this also means there will be some delay in how quickly the device is serviced once it is ready to respond to the command.

A more efficient solution to this problem is to use an asynchronous callback function according to the present invention, which is called immediately upon the occurrence of a GPIB event. Win32 GPIB applications can asynchronously receive event notifications using the ibnotify function or the GpibNotify OLE control. This is useful if the user desires the application to be notified asynchronously about the occurrence of one or more GPIB events. Using ibnotify, or GpibNotify, the application does not need to check the status of the GPIB device. When the GPIB device requests service, the GPIB driver software automatically notifies the application that the event has occurred by invoking a callback function. The callback function executes when any of the GPIB events specified in the event mask parameter have occurred.

Figure 3:
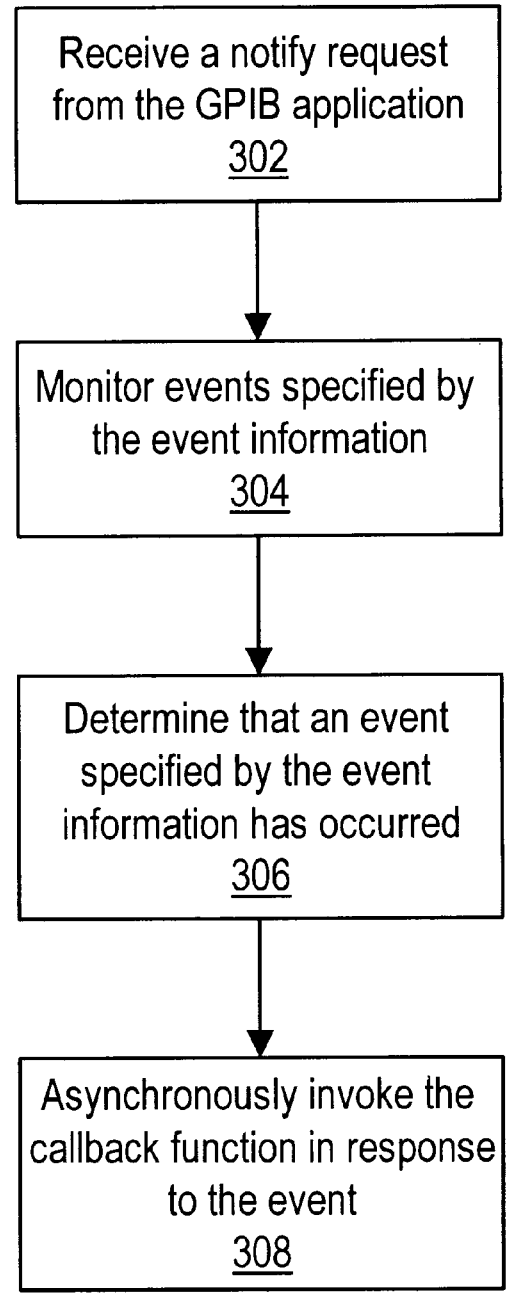
FIG. 3 is a flowchart diagram illustrating operation of the GPIB driver level software performing asynchronous event notification.

FIG. 3: Flowchart Diagram

Referring now to FIG. 3, a flowchart diagram illustrating operation of the present invention is shown. As discussed above, the present invention comprises a method of asynchronously notifying a user when one or more GPIB events occur in a GPIB system, wherein the system comprises a GPIB application which interfaces through GPIB driver software to a GPIB device. The GPIB driver software is preferably configured to use interrupts.

As shown, in step 302 the GPIB driver software receives an asynchronous notify request from the GPIB application. As discussed above, the asynchronous notify request includes a unit descriptor, event information regarding a plurality of GPIB events to monitor, a reference to a callback function in the GPIB application, and user defined reference data for the callback function. The unit descriptor uniquely identifies the GPIB device. The event information preferably comprises a bit mask comprising a plurality of bits, wherein the bits in the bit mask are set to indicate monitoring of events.

In step 304 the GPIB driver software begins monitoring events specified by the event information, i.e., begins monitoring events specified by the bits set in the bit mask. The monitoring is performed in response to receiving the asynchronous notify request. In the preferred embodiment, the events comprise state changes of the GPIB device identified by the unit descriptor.

At some point in time, a relevant event is generated in the GPIB system. In other words, at some point in time an event occurs which is being monitored by the GPIB driver software in step 304. In step 306 the GPIB driver software determines that an event specified by the event information has occurred. In the preferred embodiment, an interrupt is generated in response to the event occurring. Thus the step of determining that an event specified by the event information has occurred includes receiving the interrupt indicating that the event has occurred and notifying the GPIB application of the event.

In step 308 the GPIB driver software invokes the callback function in response to the determination that the event has occurred. According to the present invention, the GPIB driver software invokes the callback function asynchronously to the GPIB application. The callback function may include one or more calls to one or more functions in the GPIB driver software. If so, then during execution of the callback function to handle the event, the callback function invokes the one or more functions in the GPIB driver software. Also, the callback function to handle the event preferably uses the user-defined reference data.

The callback function preferably returns a return value which is interpreted as a mask value. As described above, this return mask value is used to automatically rearm the asynchronous event notification mechanism. If the return mask value is 0, the asynchronous event notification mechanism is not rearmed.

ibnotify/GPIB Notify Function Definition

The purpose of ibnotify and GPIBNotify is to provide asynchronous event notification, e.g., to notify the user of one or more GPIB events by invoking the user callback. ibnotify is a function, and GpibNotify is an OLE control.

1. ibnotify

Format for ibnotify

C Format: int ibnotify (int ud, int mask, GpibNotifyCallback_t Callback, void*RefData)

Visual Basic Format: Not supported. Refer to the GpibNotify OLE control discussion below.

Input for ibnotify:

| | |
|---|---|
| ud | Unit descriptor |
| mask | Bit mask of GPIB events to notice |
| Callback | Pointer to the callback function (see prototype below) |
| RefData | User-defined reference data for the callback |

Output for ibnotify:

| | |
|---|---|
| Function Return | The value of ibsta |

Description of ibnotify:

If mask is non-zero, ibnotify monitors the events specified by mask, and when one or more of the events is true, the Callback is invoked. For a board-level ibnotify call, all mask bits are valid except for ERR and RQS. For a device-level ibnotify call, the only valid mask bits are CMPL, TIMO, END, and RQS. If TIMO is set in the notify mask, ibnotify calls the callback function when the timeout period has elapsed, if one or more of the other specified events have not already occurred. If TIMO is not set in the notify mask, then the callback is not called until one or more of the specified events occur.

Notification is performed when the state of one or more of the mask bits is true. Thus if a request is made to be notified when CMPL is true, and CMPL is currently true, the Callback is invoked immediately.

For device-level usage, notification on RQS is not guaranteed to work if automatic serial polling is disabled. By default, automatic serial polling is enabled.

A given ud can have only one outstanding ibnotify call at any one time. If a current ibnotify is in effect for ud, it is replaced by a subsequent ibnotify call. An outstanding ibnotify call for ud can be canceled by a subsequent ibnotify call for ud that has a mask of zero.

If an ibnotify call is outstanding and one or more of the GPIB events the call is waiting on become true, the Callback is invoked.

The ibnotify mask bits are defined in the following table:

Notify Mask Layout

| Mnemonic | Bit Pos | Hex Value | Description |
|---|---|---|---|
| TIMO | 14 | 4000 | Use the timeout period (see ibtmo) to limit the notify period |
| END | 13 | 2000 | END or EOS is detected |
| SRQI | 12 | 1000 | SRQ is asserted (board only) |
| RQS | 11 | 800 | Device requested service (device only) |
| CMPL | 8 | 100 | I/O is complete (board only) |
| LOK | 7 | 80 | GPIB board is in Lockout State (board only) |
| REM | 6 | 40 | GPIB board is in Remote State (board only) |
| CIC | 5 | 20 | GPIB board is CIC (board only) |
| ATN | 4 | 10 | Attention is asserted (board only) |
| TACS | 3 | 8 | GPIB board is Talker (board only) |
| LACS | 2 | 4 | GPIB board is Listener (board only) |
| DTAS | 1 | 2 | GPIB board is in Device Trigger State (board only) |
| DCAS | 0 | 1 | GPIB board is in Device Clear State (board only) |

Callback Prototype for ibnotify:
    int_stdcall Callback (int LocalUd, int LocalIbsta, int LocalIberr, long LocalIbcntl, void*RefData)

Callback Parameters

| | |
|---|---|
| LocalUd | Board or device descriptor |
| LocalIbsta | Value of ibsta |
| LocalIberr | Value of iberr |
| LocalIbcntl | Value of ibcntl |
| RefData | User-defined reference data for the callback |

Callback Return Value:
    Bit mask of the GPIB events to notice next

The Callback function executes in a separate thread in the user's process. Therefore, the callback function has access to any process global data, but no access to thread local data. If the Callback needs to access global data, the user application must protect that access using a synchronization primitive (for example, a semaphore) because the Callback is running in a different thread context. Alternatively, the issue of data protection can be avoided entirely if the Callback simply posts a message to the user application using the Windows PostMessageo function. The Callback function can call any of the NI-488 or NI-488.2 functions with the exception of ibnotify. When the Callback is invoked, the values of the GPIB global variables (ibsta, iberr, ibcntl) are undefined. The status variables passed to Callback should be examined, instead of the GPIB globals, to determine why the Callback was invoked. It is noted that it is possible that the Callback may be invoked because of an error condition rather than because of the setting of one or more of the requested mask bits.

The return value of the Callback is interpreted as a mask value, which is used to automatically rearm the asynchronous event notification mechanism. If the return value is zero, it is not rearmed. If the return value is non-zero, the asynchronous event notification mechanism is rearmed with the return mask value. If the Callback rearm fails due to an error, the Callback is invoked with LocalIbsta set to ERR, LocalIberr set to EDVR, and LocalIbcntl set to IBNOTIFY_REARM_FAILED.

Like ibwait, ibstop, and ibonl, the invocation of the ibnotify Callback can cause the resynchronization of the handler after an asynchronous I/O operation has completed. In this case, the global variables passed into the Callback after I/O has completed contain the status of the I/O operation.

For an overview of asynchronous event notification in a GPIB application, refer to the Asynchronous Event Notification section. For more information on usage, refer to the ibnotify Usage section.

Possible Errors for ibnotify:
EARG: A bit set in mask is invalid.
ECAP: ibnotify has been invoked from within an ibnotify Callback finction, or the handler cannot perform notification on one or more of the specified mask bits.
EDVR: Either ud is invalid or the NI-488.2M driver is not installed. ibcntl contains a system-dependent error code.
ENEB: The interface board is not installed or is not properly configured.

Possible Errors for ibnotify Callback
EDVR: The Callback return failed to rearm the Callback.

2. GPIBNotify

Format for the GpibNotify OLE Control
Visual Basic: status&=GpibNotifyx.SetupNotify ud%, mask%; where x is the instance of the GpibNotify OLE control.

| Input for the GpibNotify OLE Control | |
|---|---|
| ud | Unit descriptor |
| mask | Bit mask of GPIB events to notice |

The mask parameter is optional. Alternative ways to set the mask value include using the SetSetupMask method or changing its value on the SetupMask page of the GpibNotify control properties.

| Output for the GpibNotify OLE Control: | |
|---|---|
| Function Return | The value of ibsta |

Description of the GpibNotify OLE Control:

If mask is non-zero, GpibNotify monitors the events specified by mask, and when one or more of the events is true, the Callback is invoked. For a board-level GpibNotify call, all mask bits are valid except for ERR and RQS. For a device-level GpibNotify call, the only valid mask bits are CMPL, TIMO, END, and RQS.

Notification is performed when the state of one or more of the mask bits is true, so if a request is made to be notified when CMPL is true, and CMPL is currently true, the Callback is invoked immediately.

For device-level usage, notification on RQS is not guaranteed to work if automatic serial polling is disabled. By default, automatic serial polling is enabled.

A given ud can have only one outstanding GpibNotify call at any one time. If a current GpibNotify is in effect for ud, it is replaced by a subsequent GpibNotify call. An outstanding GpibNotify call for ud can be canceled by a subsequent GpibNotify call for ud that has a mask of zero.

If a GpibNotify call is outstanding and one or more of the GPIB events it is waiting on become true, the Callback is invoked.

After a SetupNotify call is made, the global GPIB status variables (ibsta, iberr, ibcnt, and ibcntl) are undefined. Instead, the thread-specific GPIB status variable functions (ThreadIbsta( ), ThreadIberr( ), ThreadIbcnt( ) and ThreadIbcntl( )) should be used to examine the GPIB status variables returned by the SetupNotify call. This restriction only applies to the SetupNotify call; for the rest of the GPIB calls, the application can continue to examine ibsta, iberr, ibcnt, and ibcntl.

It is noted that Visual Basic exhibits odd behavior if the GpibNotify control is destroyed before the Callback has been executed. For this reason, the user application should cancel any outstanding Callbacks by calling SetupNotify with a mask of zero before the control is destroyed. In addition, the application should give any blocked Callback threads an opportunity to run before destroying the control by executing a Sleep 0 call.

Callback Prototype for the GpibNotify OLE Control
Private Sub GpibNotifyx_Notify(ByVal LocalUd As Long,
ByVal LocalIbsta As Long, ByVal LocalIberr As Long,
ByVal LocalIbcntl As Long, RearmMask As Long)
where x is the instance of the Notify callback routine. Each GpibNotify call has its own Callback routine.

| Callback Parameters | |
|---|---|
| LocalUd | Board or device descriptor |
| LocalIbsta | Value of ibsta |
| LocalIberr | Value of iberr |
| LocalIbcntl | Value of ibcntl |
| RearmMask | Bit mask of the GPIB events to notice next |

The Callback function can call any of the NI-488 or NI-488.2 functions with the exception of GpibNotify. When the Callback is invoked, the values of the GPIB global variables (ibsta, iberr, ibcnt, ibcntl) are undefined. The status variables passed to Callback should be examined, instead of the GPIB globals, to determine why the Callback was invoked. Notice that it is possible that the Callback may be invoked because of an error condition rather than because of the setting of one or more of the requested mask bits.

The RearmMask is interpreted as a mask value that the GPIB software uses to automatically rearm the asynchronous event notification mechanism. If RearmMask is set to zero, the Callback is not rearmed. If RearmMask is set to non-zero, the Callback is rearmed with the RearmMask value. If the Callback rearm fails because of an error, the Callback is invoked with LocalIbsta set to ERR, LocalIberr set to EDVR and LocalIbcntl set to IBNOTIFY_REARM_ FAILED, which is defined in niglobal.bas.

Like ibwait, ibstop and ibonl, the invocation of the GpibNotify Callback can cause the resynchronization of the handler after an asynchronous I/O operation has completed. In this case, the global variables passed into the Callback after I/O has completed contain the status of the I/O operation.

Possible Errors for the GpibNotify OLE Control
EARG: A bit set in mask is invalid.
ECAP: GpibNotify has been invoked from within an GpibNotify Callback function, or the handler cannot perform notification on one or more of the specified mask bits.
EDVR: Either ud is invalid or the NI-488.2M driver is not installed. ibcntl contains a system-dependent error code.
ENEB: The interface board is not installed or is not properly configured.
Possible Errors for the GpibNotify OLE Control Callback
EDVR: The GpibNotify OLE control was unable to rearm the Callback.

Ibnotify Usage

The ibnotify function is passed a unit descriptor, the bit mask of the desired GPIB events, the address of the user-defined callback function, and user-defined reference data. ibnotify has the following prototype:

```
ibnotify  (
int ud, //unit descriptor
int mask,    //bit mask of GPIB events
GpibNotifyCallback_t Callback,    //callback function
void *RefData//user-defined reference data
)
```

The ibnotify callback has the following prototype:

```
int_stdcall MyCallBack    (
int LocalUd,     //unit descriptor
int LocalIbsta,  //ibsta value
int LocalIberr,  //iberr value
long LocalIbcntl, //ibcntl value
void *RefData    //user-defined reference data
)
```

The Callback function is passed a unit descriptor, the current values of the GPIB global variables, and the user-defined reference data that was passed to the original ibnotify call. The GPIB driver interprets the return value for the Callback as a mask value that is used to automatically rearm event notification if the return value is non-zero.

The following code is an example of how a user application might use ibnotify. Assume that the GPIB device is a multimeter, and the GPIB device is programmed to acquire a reading by sending it "SEND DATA". The multimeter requests service when it has a reading ready, and each reading is a floating point value.

In this example, global variables are shared by the Callback thread and the main thread, and the access of the global variables is not protected by synchronization. In this case, synchronization of access to these global variables is not necessary because of the way they are used in the application: only a single thread is writing the global values and that thread always just adds information (increases the count or adds another reading to the array of floats).

```
int_stdcall MyCallback (int ud, int LocalIbsta, int LocalIberr,
        long LocalIbcntl, void *RefData);
int ReadingsTaken=0;
float Readings[1000];
BOOL DeviceError=FALSE;
char expectedResponse=0x43;
int main( )
{
        int ud;
        //Assign a unique identifier to the device and store it in the
        //variable ud.ibdev opens an available device and assigns it to
        //access GPIB0 with a primary address of 1, a secondary address of 0,
        //a timeout of 10 seconds, the END message enabled, and the EOS mode
        //disabled. If ud is less than zero, then print an error message
        //that the call failed and exit the program.
        ud=ibdev     (0,     //connect board
                      1,     //primary address of GPIB device
                      0,     //secondary address of GPIB device
                      T10s,  //10 second I/O timeout
                      1,     //EOT mode turned on
                      0);    //EOS mode disabled
        if (ud<0) {
                printf ("ibdev failed.\n");
                return 0;
        }
//Issue a request to the device to send the data. If the ERR bit
        //is set in ibsta, then print an error message that the call failed
        //and exit the program.
        ibwrt (ud, "SEND DATA", 9L);
        if (ibsta & ERR) {
                printf ("unable to write to device.\n");
                return 0;
        }
//set up the asynchronous event notification on RQS
        ibnotify (ud, RQS, MyCallback, NULL);
        if (ibsta & ERR) {
                printf ("ibnotify call failed.\n");
                return 0;
        }
        while ((ReadingsTaken<1000)&&!(DeviceError)) {
```

```
                //Your application does useful work here. For example, it
                //might process the device readings or do any other useful work.
            }
    //disable notification
            ibnotify (ud, 0, NULL, NULL);
            //Call the ibonl function to disable the hardware and software.
            ibonl (ud, 0);
            return 1;
    }
    int_stdcall MyCallback (int LocalUd, int LocalIbsta, int LocalIberr,
                long LocalIbentl, void *RefData)
    {
            char SpollByte;
            char ReadBuffer[40];
    //If the ERR bit is set in LocalIbsta, then print an error message
            //and return.
            if (LocalIbsta & ERR) {
                printf ("GPIB error %d has occurred. No more callbacks.\n",
                        LocalIberr);
                DeviceError=TRUE;
                return 0;
            }
    //Read the serial poll byte from the device. If the ERR bit is set
            //in ibsta, then print an error message and return.
            LocalIbsta=ibrsp (LocalUd, &SpollByte);
            if (LocalIbsta & ERR) {
                printf ("ibrsp failed. No more callbacks.\n");
                DeviceError=TRUE;
                return 0;
            }
    //If the returned status byte equals the expected response, then
            //the device has valid data to send; otherwise it has a fault
            //condition to report.
            if (SpollByte !=expectedResponse) {
                printf("Device returned invalid response. Status byte=0x%x\n",
                        SpollByte);
                DeviceError=TRUE;
                return 0;
            }
    //Read the data from the device. If the ERR bit is set in ibsta,
            //then print an error message and return.
            LocalIbsta=ibrd (LocalUD, ReadBuffer, 40L);
            if (LocalIbsta & ERR) {
                printf ("ibrd failed. No more callbacks.\n");
                DeviceError=TRUE;
                return 0;
            }
    //Convert the data into a numeric value.
            sscanf (ReadBuffer, "%f", &Readings[ReadingsTaken]);
            ReadingsTaken+=1;
            if (ReadingsTaken>=1000) {
                return 0;
            }
            else {
    //Issue a request to the device to send the data and rearm
                //callback on RQS.
                LocalIbsta=ibwrt (LocalUD, "SEND DATA", 9L);
                if (LocalIbsta & ERR) {
                    printf ("ibwrt failed. No more callbacks.\n");
                    DeviceError=TRUE;
                    return 0;
                }
                else {
                    return RQS;
                }
            }
    }
```

As noted above, the ibnotify Callback is executed in a separate thread of execution from the rest of the user application. If the application might be performing other GPIB operations while it is using ibnotify, the per-thread GPIB global variables that are provided by the Thread functions should be used. In addition, if the user application needs to share global variables with the Callback, a synchronization primitive (for example, semaphore) should be used to protect access to any global variables.

GPIBNotify Usage

The GpibNotify OLE control is implemented using a method called SetupNotify and an event called Notify. The SetupNotify method is used to enable the GPIB driver to look for one or more GPIB conditions for a particular GPIB handle. After it is set up, the OLE control fires the Notify event when one or more of the GPIB conditions is TRUE. A user-defined callback is invoked when the Notify event is fired.

This section covers the major highlights regarding a sample program that uses the GpibNotify control. The program contains three buttons: Run, Message, and Quit.

Clicking the Run button sets into motion a chain of commands that read ten measurements from a Fluke 45 multimeter. First, the program obtains a handle to the device. Next, it sends a set of commands that initialize the Fluke 45 multimeter. Then a trigger command is sent. Next the program asks the device to send data. Lastly, it issues a SetupNotify to the GpibNotify OLE control with a mask of the RQS GPIB condition.

When the RQS GPIB condition is TRUE, the Notify event is fired and the user-defined callback is invoked. Each time through the callback, the RearmMask is set to RQS so that the event notification is rearmed for the next RQS GPIB condition. After the callback has read ten measurements from the Fluke 45 multimeter, the RearmMask is set to zero in order to disable the event notification mechanism.

Clicking the Message button causes a message to be displayed in a text box every time the button is clicked.

Clicking the Quit button closes the program.

It is noted that the GpibNotify OLE control is implemented using the apartment model. Therefore, the GpibNotify OLE control only works correctly if the user application responds to Windows messages in a timely fashion.

Description of the GpibNotify OLE Control for Visual Basic

In Visual Basic, asynchronous callback functions are not supported. However, it is still possible to set up the equivalent of an asynchronous callback function for GPIB events by using an OLE control. The present invention includes an OLE control, referred to as GPIBNotify, designed for use with Visual Basic that encompasses the same functionality as the C ibnotify function.

The GpibNotify OLE control is preferably automatically installed and registered with the operating system when the GPIB driver software is installed. Alternatively, the user can manually install and register the GpibNotify OLE control.

Figure 4:
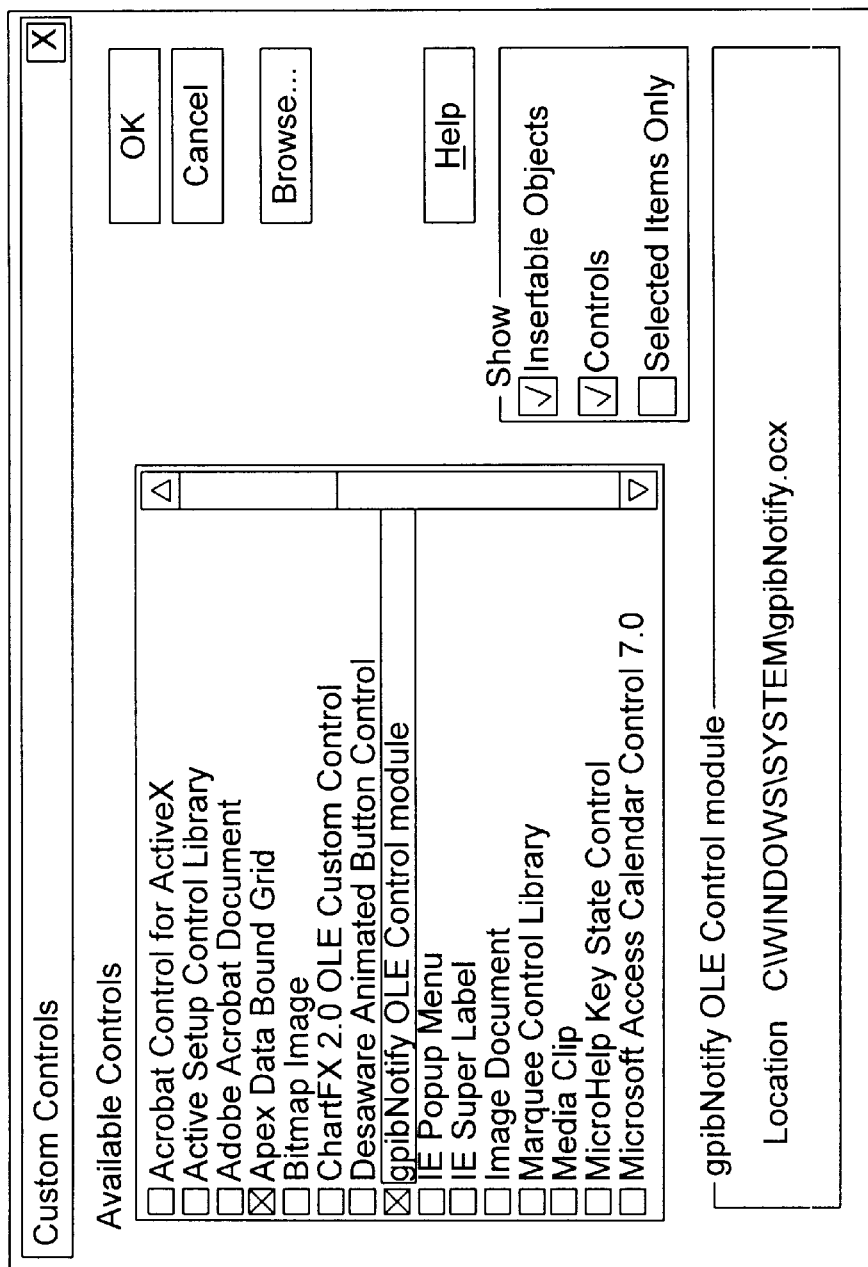
FIG. 4 illustrates the Custom Controls dialog box used for adding the GpibNotify OLE control to the toolbox.

Referring now to FIG. 4, in order to add the GpibNotify OLE control to the toolbox, the user performs the following steps:

1. Select Tools from the menu bar.
2. Select Custom Controls . . . from the drop-down list.
3. In the Custom Controls dialog box that appears, put an X in the box to the left of the gpibNotify OLE Control module by clicking on the box itself as shown in FIG. 4. Click OK.

Figure 5:
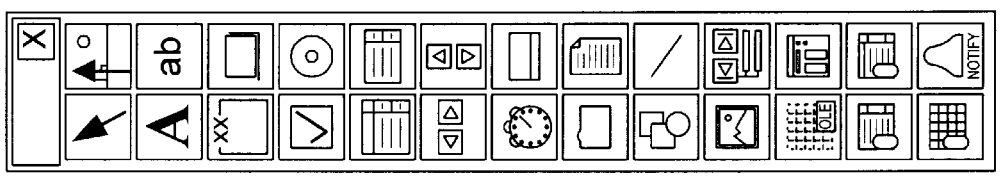
FIG. 5 illustrates a Notify icon added to Toolbox.

As shown in FIG. 5, an icon is added to the user's Toolbox. The new icon contains a picture of a bell with the label NOTIFY. An example of the updated Toolbox is shown in FIG. 5. The new NOTIFY item is located in the lower right hand corner.

Figure 6:
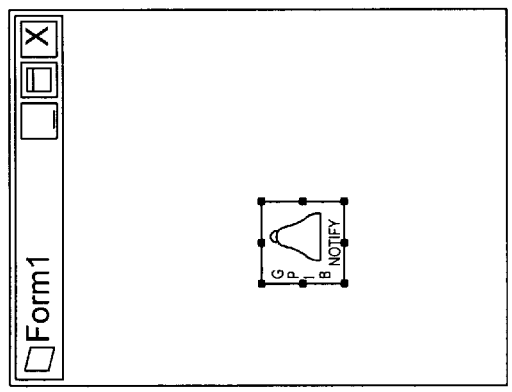
FIG. 6 illustrates a GpibNotify OLE control being placed on a Visual Basic form.

Once the GpibNotify OLE control has been added to the toolbox it can be placed on a Visual Basic form in the same manner as any other control. For each GpibNotify OLE control that the user desires to add, the user follows the instructions below:

1. Double-click on the NOTIFY icon in the ToolBox. This places the GPIB notify icon onto the user's form as shown in FIG. 6.
2. To add code to the callback routine, the user double-clicks on the GPIB notify icon. The callback routine is named GpibNotifyX_Notify, where X is the particular numbered GpibNotify control. Each GpibNotify OLE control is numbered. The first control is numbered 1, the next control is numbered 2, and so on.

Setting Up The Event Mask And Installing The Callback Routine

For each GpibNotify control, a mask must be set up to determine which events will trigger the callback. There are three different ways that the mask can be set in Visual Basic.

METHOD 1:

The easiest way to set the event mask is to modify the GpibNotify Control Properties page. To access that page, the user follows the steps below:

1. Right-click on the GPIB notify icon as it appears on the form.
2. Select Properties . . . from the drop-down list.
3. In the GpibNotify Control Properties dialog box, click on the box to the left of the GPIB event for each and every GPIB event that you wish to monitor.
4. When the user has finished selecting all the desired GPIB events, click OK.

To use the call, the user enters the following line of code in his/her application:

GpibNotifyX.SetupNotify ud where X is the numbered control that the user wants to invoke and ud is the unit descriptor that was obtained by using either ibdev or ibfind.

METHOD 2:

Another method is to assign a SetupMask value to the SetupNotify function by declaring an integer value and setting it to the desired GPIB event(s) as shown below:

Dim mask As Integer
mask=XXX where XXX is the desired GPIB event(s) (for example, CMPL, RQS, TIMO) that you wish to invoke the callback with. The call to SetupNotify would look like this:

GpibNotifyX.SetupNotify ud, mask where X is for the particular numbered control that the user desires to invoke and where ud is the unit descriptor that was obtained using either ibdev or ibfind. If the user has set up the GpibNotify control properties page as in method 1, calling GpibNotifyX.SetupNotify with a mask parameter will override the choices made on the properties page.

METHOD 3:

The third method is to initialize the SetupMask for the desired GPIB events by directly modifying the SetupMask property as shown below. This method will also override the control properties page.

GpibNotifyX.SetupMask=RQS

Then the user can call the SetupNotify function with only a unit descriptor:

GpibNotifyX.SetupNotify ud

GpibNotify OLE Control Example in Visual Basic

The example below is intended only to show the basic program flow for using the GpibNotify OLE control. The example shows how a GPIB application could acquire data. This example shows the basic program flow for using the GpibNotify OLE control. It is written to work with a fictitious device with GPIB address two. The device responds to the string "SEND DATA" by asserting SRQ when the data is available. The data is a floating point value. The program uses a blank form containing only a GpibNotify OLE control. The GpibNotify procedure and the form load procedure are the only defined procedures for the example. They are shown below. This example is only designed to be run once. It could be easily modified to run multiple times by placing the form load procedure inside a command button click procedure and rearming the GpibNotify mask with RQS instead of zero. In addition to registering the OLE control a Visual Basic project using GPIB commands must include the niglobal.bas and vbib-32.bas modules. These modules are available with the GPIB Software.

Visual Basic Example

```
Visual Basic Private Sub Form_Load()
    ' Assign a unique identifier to the device and store
    ' it in the variable ud. ibdev opens an available
    ' device and assigns it to access GPIB0 with a primary
    ' address of 2, a secondary address of 0, a timeout of
    ' 10 seconds, the END message enabled, and the EOS
    ' mode disabled. If us id less than zero, then print
    ' an error message that the call failed and exit
    ' the program.
    Call ibdev(0, 2, 0, T10s, 1, 0, ud)
    If (ud < 0) Then
        MsgBox "ibdev error. I'm quitting!", 16
        End
    End If
    ' Install the GpibNotify callback mechanism for the OLE
    ' Control by calling its SetupNotify Procedure with an
    ' event mask for the RQS Event.
    GpibNotify1.SetupMask = RQS
    GpibNotify1.SetupNotify ud
    ' Check to see if there was an error invoking the GpibNotify Callback mechanism.
    If (TreadIbsta() And EERR) Then
        msg$ = "Error invoking Notification for RQS! ibsta = &H" +
            Hex$(ThreadIbsta())
        MsgBox msg$, vbCritical, "GPIB Notification Error!"
        msg$ = "iberr = " + Str$(ThreadIberr())
        MsgBox msg$, vbCritical, "GPIB Notification Error!"
        ' Call the ibon1 function to disable the hardware and software.
        Call ibon1(ud, 0)
        End
    End If
    If (ThreadIbsta() And &H4000) Then
        MsgBox ("Notification for RQS timed out.")
        End
    End If
    ' Write a command to the instrument to generate data and
    ' assert the SRQ line when the data is available.
    wrtbuf$ = "SEND DATA"
    Call ibwrt(ud, wrtbuf$)
    If (ibsta And EERR) Then
        MsgBox ("ibwrt Error!")
        ' Call the ibon1 function to disable the hardware and software.
        Call ibon1(ud, 0)
        End
    End If
End Sub
Private Sub GpibNotify1_Notify(ByVal LocalUd As Long, ByVal LocalIbsta As Long,
By Val LocalIberr As Long, ByVal LocalIbcntl As Long, RearmMask As Long)
    ' This is the user-defined callback routine that
    ' gets invoked when one or more GPIB events in the
    ' mask that is passed to the SetupNotify method occurs.
    '
    ' For this sample program, a data point will be read and
    ' displayed from the device.
    Dim SPollByte As Integer
    ' If ERR bit is set in LocalIbsta that is passed into
    ' this subroutine, then print an error message and
    ' exit the function.
    If LocalIbsta And EERR Then
        MsgBox "Error with GPIB Notify #1-No more callbacks.", 16
        Exit Sub
    End If
    ' NOTE:      for the rest of this subroutine, the global
    '            version of ibsta is used when checking to see
    '            if the error bit is set or not.
    ' Read the serial poll status byte. If the
    ' error bit EERR is set in ibsta, display an error
    ' message and exit.
    Call ibrsp(LocalUd, SPollByte)
    If (ibsta And EERR0 Then
        MsgBox ("ibrs) Error!")
```

| Visual Basic Example |
|---|

```
        RearmMask = 0
        Exit Sub
    End If
    ' If the returned status byte is &H50 then the instrument
    ' has valid data to send
    If(SPollByte ◊ &H50) Then
        MsgBox("Serial poll byte is NOT &H50.")
        RearmMask = 0
        Exit Sub
    End If
    ' Read the data. If the error bit EERR is
    ' set in ibsta, display an error message
    ' and exit.
    rdbuf$ = Space$(20)
    Call ibrd(LocalUd, rdbuf$)
    If (ibsta And EERR) Then
        MsgBox ("ibrd Error!")
        RearmMask = 0
        Exit Sub
    End If
    ' Display the Reading.
    MsgBox (rdbuf$)
    ' Rearm Mask is set to zero to disable the
    ' Callback mechanism. This example is only
    ' designed to run once to show flow for using
    ' GpibNotify Control.
    RearmMask = 0
End Sub
```

Conclusion

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method of asynchronously notifying a GPIB application when one or more GPIB events occur in a GPIB system, wherein the system comprises the GPIB application which interfaces through GPIB driver software to a GPIB device, wherein the GPIB application and the GPIB driver software execute on a computer system, the method comprising:

receiving an asynchronous notify request from the GPIB application, wherein the asynchronous notify request includes a unit descriptor, event information regarding a plurality of GPIB events to monitor, and a reference to a callback function in the GPIB application, wherein the unit descriptor uniquely identifies the GPIB device; and monitoring events specified by said event information, wherein said monitoring is performed in response to said receiving said asynchronous notify request, wherein said events comprise state changes of the GPIB device identified by the unit descriptor;

determining that an event specified by said event information has occurred;

invoking said callback function in response to said determining that said event has occurred, wherein said invocation is performed asynchronously to the GPIB application.

2. The method of claim 1, wherein said callback function includes one or more calls to one or more functions in the GPIB driver software, the method further comprising:

executing said callback function to handle the event, wherein said callback function invokes said one or more functions in the GPIB driver software.

3. The method of claim 2, wherein the asynchronous notify request further includes user defined reference data for said callback function;

wherein said executing said callback function to handle the event includes using said user defined reference data.

4. The method of claim 1, further comprising:

configuring the GPIB driver software to use interrupts prior to receiving the asynchronous notify request from the GPIB application;

said event occurring;

generating an interrupt in response to said event occurring wherein said determining that an event specified by said event information has occurred includes:

receiving the interrupt indicating that said event has occurred; and asynchronously notifying the GPIB application of said event.

5. The method of claim 1, wherein said event information comprises a bit mask, wherein said bit mask specifies said plurality of GPIB events to monitor, wherein said bit mask includes a plurality of bits, wherein each of said plurality of bits represents one of said GPIB events to monitor;

wherein said monitoring comprises monitoring events identified by said bits in said bit mask.

6. The method of claim 5, the method further comprising:

executing said callback function to handle the event, wherein said callback function returns a mask value; and rearming said event information with said mask value returned by said callback function;

wherein said monitoring events, determining that an event specified by said event information has occurred, and invoking said callback are repeated using said mask value returned by said callback function.

7. The method of claim 5, wherein said plurality of GPIB events to monitor include a timeout event;

wherein said bit mask includes a timeout bit, wherein said timeout bit is set to indicate monitoring of said timeout event;

when said timeout event occurs when a timeout period has elapsed.

8. The method of claim 1, wherein the GPIB device is a GPIB interface board comprised in the computer system, wherein the events comprise: TIMO, END, SRQI, CMPL, LOK, REM, CIC, ATN, TACS, LACS, DTAS, and DCAS.

9. The method of claim 1, wherein the GPIB device is a GPIB instrument coupled to the computer system, wherein the events comprise: TIMO, END, RQS, and CMPL.

10. The method of claim 1, wherein said monitoring events, determining that an event specified by said event information has occurred, and invoking said callback function are performed by the GPIB driver software.

11. The method of claim 10, wherein the GPIB application does not check the status of the GPIB device the GPIB driver software monitoring events.

12. The method of claim 1, further comprising:

beginning an asynchronous I/O operation;

receiving a notify request from the GPIB application after beginning the asynchronous I/O operation; and resynchronizing the GPIB driver level software in response to receiving the notify request.

13. The method of claim 1, wherein said notify request comprises an OLE control.

14. A GPIB system which asynchronously notifies a GPIB application when one or more GPIB events occur in the GPIB system, the GPIB system comprising:

a computer system comprising a CPU and memory, wherein the memory stores the GPIB application and GPIB driver software, wherein the GPIB application and the GPIB driver software execute on the computer system; and a GPIB device coupled to the computer system, wherein the GPIB application interfaces through the GPIB driver software to the GPIB device;

wherein the GPIB application executing on the computer system is operable to provide an asynchronous notify request to the GPIB driver software, wherein the asynchronous notify request includes a unit descriptor, event information regarding a plurality of GPIB events to monitor, and a reference to a callback function in the GPIB application, wherein the unit descriptor uniquely identifies the GPIB device;

wherein the GPIB driver software executing on the computer system is operable to monitor events specified by said event information in response to the asynchronous notify request, wherein said events comprise state changes of the GPIB device identified by the unit descriptor;

wherein the GPIB driver software executing on the computer system is operable to determine that an event specified by said event information has occurred and is operable to invoke said callback function in response to determining that said event has occurred, wherein said invocation is performed asynchronously to the GPIB application.

15. The GPIB system of claim 14, wherein said callback function includes one or more calls to one or more functions in the GPIB driver software;

wherein said callback function invokes said one or more functions in the GPIB driver software.

16. The GPIB system of claim 15, wherein the asynchronous notify request further includes user defined reference data for said callback function;

wherein said callback function uses said user defined reference data during execution.

17. The GPIB system of claim 14, wherein said event information comprises a bit mask, wherein said bit mask specifies said plurality of GPIB events to monitor, wherein said bit mask includes a plurality of bits, wherein each of said plurality of bits represents one of said GPIB events to monitor.

18. The GPIB system of claim 14, wherein the GPIB device is a GPIB interface board comprised in the computer system, wherein the events comprise: TIMO, END, SRQI, CMPL, LOK, REM, CIC, ATN, TACS, LACS, DTAS, and DCAS.

19. The GPIB system of claim 14, wherein the GPIB device is a GPIB instrument coupled to the computer system, wherein the events comprise: TIMO, END, RQS, and CMPL.

20. A memory media which stores program instructions for asynchronously notifying a GPIB application when one or more GPIB events occur in a GPIB system, wherein the system comprises the GPIB application which interfaces through GPIB driver software to a GPIB device, wherein the GPIB application and the GPIB driver software execute on a computer system, wherein the program instructions are executable to implement the steps of:

receiving an asynchronous notify request from the GPIB application, wherein the asynchronous notify request includes a unit descriptor, event information regarding a plurality of GPIB events to monitor, and a reference to a callback function in the GPIB application, wherein the unit descriptor uniquely identifies the GPIB device;

monitoring events specified by said event information, wherein said monitoring is performed in response to said receiving said asynchronous notify request, wherein said events comprise state changes of the GPIB device identified by the unit descriptor;

determining that an event specified by said event information has occurred; and invoking said callback function in response to said determining that said event has occurred, wherein said invocation is performed asynchronously to the GPIB application.

* * * * *

UNITED STATES PATENT AND TRADEMARK OFFICE

CERTIFICATE OF CORRECTION

PATENT NO. : 5,974,541

DATED : October 26, 1999

INVENTOR(S) : Mike Hall and Clay Bean

It is certified that error appears in the above-identified patent and that said Letters Patent is hereby corrected as shown below:

Claim 1 col. 19, line 53, please delete "and"

Claim 1 col. 19, line 60, please insert --and-- after occurred;.

Signed and Sealed this

Thirteenth Day of June, 2000

*Attest:*

Q. TODD DICKINSON

*Attesting Officer*     *Director of Patents and Trademarks*